United States Patent
Yu et al.

(10) Patent No.: US 11,619,297 B2
(45) Date of Patent: Apr. 4, 2023

(54) OIL LUBRICATION MECHANISM FOR FRONT BEARING OF WATER-COOLED MOTOR AND MOTOR DRIVING ASSEMBLY

(71) Applicant: Jing-Jin Electric Technologies Co., Ltd., Beijing (CN)

(72) Inventors: Ping Yu, Beijing (CN); Jianwen Li, Beijing (CN); Defeng Hou, Beijing (CN); Lei Tian, Beijing (CN); Yong Wu, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/415,739

(22) PCT Filed: Dec. 11, 2019

(86) PCT No.: PCT/CN2019/124578
§ 371 (c)(1),
(2) Date: Jun. 18, 2021

(87) PCT Pub. No.: WO2020/125514
PCT Pub. Date: Jun. 25, 2020

(65) Prior Publication Data
US 2022/0042591 A1 Feb. 10, 2022

(30) Foreign Application Priority Data
Dec. 18, 2018 (CN) .......................... 201811548562.4

(51) Int. Cl.
*F16H 57/04* (2010.01)
*F16C 33/66* (2006.01)

(52) U.S. Cl.
CPC ..... *F16H 57/0476* (2013.01); *F16C 33/6659* (2013.01); *F16C 33/6685* (2013.01);
(Continued)

(58) Field of Classification Search
CPC ............. F16H 57/0421; F16H 57/0423; F16H 57/0457; F16H 57/0471; F16H 57/0476;
(Continued)

(56) References Cited

U.S. PATENT DOCUMENTS 1,865,088 A * 6/1932 Daun .................. F16C 33/6659
384/465
3,042,462 A * 7/1962 Rosskopf ............ F16C 33/6659
384/466
(Continued)

FOREIGN PATENT DOCUMENTS

CN 103161922 A 6/2013
CN 108561542 A 9/2018
(Continued)

OTHER PUBLICATIONS

International Search Report dated Mar. 6, 2020 for International Application No. PCT/CN2019/124578.
(Continued)

*Primary Examiner* — Minh Truong
(74) *Attorney, Agent, or Firm* — Moser Taboada

(57) ABSTRACT

The present disclosure discloses an oil-lubrication mechanism for a fore bearing of a water-cooled electric motor and an electric-motor driving assembly, which solves the problems of conventional grease lubrication of the fore bearing of water-cooled electric motors such as serious bearing heat generation and bearing failure and low life caused by easy outflowing of the grease. The oil-lubrication mechanism includes a gear-splashing oil-storage structure provided in a gearbox or a reduction gearbox, and a bearing-baffle oil-storage structure provided at a front end of the water-cooled electric motor; and a gear in the gearbox or the reduction
(Continued)

gearbox in operation throws a lubricating oil into the gear-splashing oil-storage structure, and the lubricating oil is delivered via the oil conduit into the bearing-baffle oil-storage structure, thereby lubricating the fore bearing of the water-cooled electric motor, and subsequently the lubricating oil flows back into the gearbox or the reduction gearbox via the oil return tube. In the present disclosure, the lubricating oil that splashes inside the gearbox or the reduction gearbox is introduced into the fore bearing of the water-cooled electric motor, which enables the fore bearing of the water-cooled electric motor to be lubricated by the oil, thereby reducing the heat generation of the fore bearing of the water-cooled electric motor, and improving the life of the fore bearing and the reliability of the electric motor.

3 Claims, 2 Drawing Sheets

(52) U.S. Cl.
CPC ....... *F16H 57/045* (2013.01); *F16H 57/0423* (2013.01); *F16H 57/0457* (2013.01)

(58) Field of Classification Search
CPC ... F16C 33/6659; F16C 33/6685; H02K 5/20; H02K 9/19
See application file for complete search history.

(56) References Cited

U.S. PATENT DOCUMENTS

| | | | |
|---|---|---|---|
| 2012/0031727 A1* | 2/2012 | Nett | F16H 57/0457 192/113.1 |
| 2012/0129614 A1* | 5/2012 | Knoblauch | F16H 57/0427 464/7 |
| 2012/0286607 A1* | 11/2012 | Shimizu | F16H 57/0483 310/90 |
| 2013/0229073 A1* | 9/2013 | Momin | F16C 33/6662 310/90 |
| 2016/0032977 A1* | 2/2016 | Rodrigues | F16C 33/6662 184/6.24 |
| 2019/0017542 A1* | 1/2019 | Suzuki | F16C 33/6681 |
| 2022/0316581 A1* | 10/2022 | Li | F16H 57/045 |
| 2022/0320953 A1* | 10/2022 | Kasahara | H02K 9/19 |

FOREIGN PATENT DOCUMENTS

| | | | |
|---|---|---|---|
| CN | 208057908 U | 11/2018 | |
| CN | 109538743 A | 3/2019 | |
| DE | 223205 A1 | 6/1985 | |
| DE | 102022202609 A1 * | 9/2022 | F16H 57/021 |
| FR | 2740853 A1 | 5/1997 | |
| GB | 757480 A | 9/1956 | |
| JP | 2011256969 A * | 12/2011 | F16H 57/0476 |

OTHER PUBLICATIONS

European Search Report for application No. EP19899179 dated Nov. 15, 2021.

* cited by examiner

OIL LUBRICATION MECHANISM FOR FRONT BEARING OF WATER-COOLED MOTOR AND MOTOR DRIVING ASSEMBLY

TECHNICAL FIELD

The present disclosure relates to a mechanism for delivering a lubricating oil, and particularly relates to an oil-lubrication mechanism for a fore bearing of a water-cooled electric motor. The present disclosure further relates to an electric-motor driving assembly.

BACKGROUND

Currently, there are mainly two types of the lubrication modes of the fore bearing of electric motors. One type is the oil lubrication employed in oil-cooled electric motors, which requires an oil pump to complete the circulation of the oil way, which results in a complicated structure, and increases the manufacturing cost. The other type is the grease lubrication employed in water-cooled electric motors, which has easy outflowing of the lubricating grease, a large bearing friction, a poor heat dissipation and a low allowable rotational speed ratio, which reduces the life of the bearing to a certain extent and cannot satisfy applications of high rotational speeds.

With the progressive development of new-energy vehicles, the electric motors are required to handle increasingly more complicated working conditions, and users are having increasingly more urgent demands on balancing the maximum rotational speed, the temperature rise and the life of the electric motor. Electric motors that employ the traditional lubrication modes have become incapable of satisfying the requirements of the industry of new-energy vehicles on the development of vehicles that can balance the high power, the high torque, the maximum vehicle speed and the maximum life.

SUMMARY

Aiming at the above problems in the prior art, the present disclosure provides an oil-lubrication mechanism for a fore bearing of a water-cooled electric motor, which introduces the lubricating oil that splashes inside the gearbox or the reduction gearbox into the fore bearing of the water-cooled electric motor, which enables the fore bearing of the water-cooled electric motor to be lubricated by the oil, which effectively reduces the heat generation of the bearing, increases the service life of the fore bearing of the water-cooled electric motor, and is suitable for the working condition of high-speed operation.

The present disclosure further provides an electric-motor driving assembly, to which is installed the oil-lubrication mechanism for a fore bearing of a water-cooled electric motor stated above.

In order to solve the above problems, the technical solutions of the present disclosure are realized as follows:

One aspect of the present disclosure provides an oil-lubrication mechanism for a fore bearing of a water-cooled electric motor, wherein the oil-lubrication mechanism comprises a gear-splashing oil-storage structure provided in a gearbox or a reduction gearbox, and a bearing-baffle oil-storage structure provided at a front end of the water-cooled electric motor, the gear-splashing oil-storage structure and the bearing-baffle oil-storage structure are communicated by an oil conduit, and the bearing-baffle oil-storage structure and the gearbox or the reduction gearbox are communicated by an oil return tube; and a gear in the gearbox or the reduction gearbox in operation throws a lubricating oil into the gear-splashing oil-storage structure, and the lubricating oil is delivered via the oil conduit into the bearing-baffle oil-storage structure, thereby lubricating the fore bearing of the water-cooled electric motor, and subsequently the lubricating oil flows back into the gearbox or the reduction gearbox via the oil return tube.

Optionally, the gear-splashing oil-storage structure comprises an oil storage tank provided at an inner wall of a housing of the gearbox or the reduction gearbox, and in operation of gears in the gearbox or the reduction gearbox, a gearwheel that contacts the lubricating oil at a bottom of the gearbox or the reduction gearbox splashing-throws the lubricating oil into the oil storage tank.

Optionally, the oil storage tank is cast or welded or bolt-fixed to the inner wall of the housing of the gearbox or the reduction gearbox, and an oil outlet for connecting to the oil conduit is provided at a position of the housing of the gearbox or the reduction gearbox that corresponds to the oil storage tank.

Optionally, a side wall of a side of the oil storage tank that receives the lubricating oil is arc-shaped.

Optionally, the bearing-baffle oil-storage structure comprises a bearing seat provided at a front end of a housing of the water-cooled electric motor, the fore bearing of the water-cooled electric motor is provided in the bearing seat, a bearing baffle for half-closing the bearing seat is provided at a rear end of the bearing seat, the fore bearing of the water-cooled electric motor presses against the bearing baffle, and the lubricating oil stored at a bottom of the bearing seat lubricates the fore bearing of the water-cooled electric motor.

A gap is provided between an inner bore of the bearing baffle and a shaft of the water-cooled electric motor, and when a liquid level of the lubricating oil stored at the bottom of the bearing seat is higher than an edge of the inner bore of the bearing baffle, the lubricating oil flows out of the bearing seat, and flows into the housing of the water-cooled electric motor.

Optionally, the housing of the water-cooled electric motor comprises a front end cover, the bearing seat is provided in the front end cover, and an oil inlet for connecting to the oil conduit is provided at a position of the front end cover that corresponds to the bearing seat.

Optionally, the oil return tube is provided in an inner wall of the housing of a lower part of the water-cooled electric motor, an inlet of the oil return tube is located inside the housing of the water-cooled electric motor, and the lubricating oil flows out of the bearing seat, and flows back into the gearbox or the reduction gearbox via the oil return tube, to form a complete oil way.

Optionally, the oil conduit is provided in an inner wall of the housing of an upper part of the water-cooled electric motor.

Optionally, an input oil channel that is in communication with the oil conduit is provided in the front end cover at an upper part of the bearing seat.

Optionally, a rear end of the housing of the water-cooled electric motor is mounted to a front end cover of the housing of the gearbox or the reduction gearbox, and an oil inlet that is in communication with the oil return tube is provided at the front end cover of the housing of the gearbox or the reduction gearbox.

A liquid level of the lubricating oil in the gear-splashing oil-storage structure is higher than a liquid level of the lubricating oil in the bearing-baffle oil-storage structure, and the lubricating oil is delivered by gravity from the gear-splashing oil-storage structure to the bearing-baffle oil-storage structure via the oil conduit.

Another aspect of the present disclosure provides a water-cooled-electric-motor driving assembly, comprising a water-cooled electric motor and a gearbox or a reduction gearbox, wherein the water-cooled-electric-motor driving assembly further comprises the oil-lubrication mechanism for a fore bearing of a water-cooled electric motor stated above.

The oil-lubrication mechanism for a fore bearing of a water-cooled electric motor, by employing the above structure configuration, has the following advantages:

In the present disclosure, two oil storage structures are provided respectively inside the water-cooled electric motor and the gearbox or the reduction gearbox. The lubricating oil, inside the gearbox or the reduction gearbox, enters the first oil storage structure by splashing, and is delivered via the oil conduit to the second oil storage structure, whereby, as the fore bearing of the water-cooled electric motor is located in the second oil storage structure, the fore bearing of the water-cooled electric motor can be lubricated by oil. The present disclosure effectively reduces the heat generation of the bearing, increases the service life of the fore bearing of the water-cooled electric motor, and is suitable for the working condition of high-speed operation.

In the present disclosure, the fore bearing of the water-cooled electric motor is lubricated by oil (the rear bearing of the water-cooled electric motor is also lubricated by oil), which is suitable for high-speed rotation, has a good high-temperature stability, and can reduce the temperature, facilitate to remove the abrasive particles and dusts inside the bearing, and increase the life of the bearing.

Figure 1:
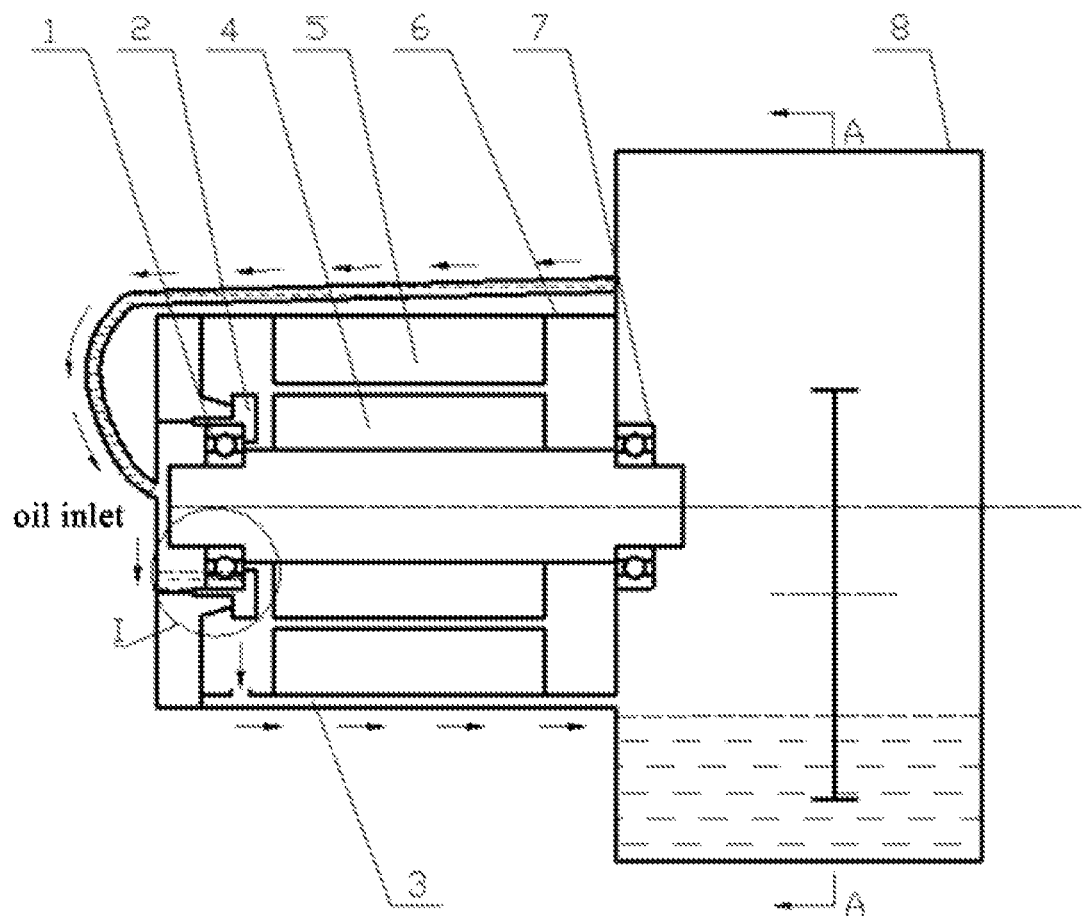
FIG. 1 is a schematic structural diagram of the water-cooled-electric-motor driving assembly according to an embodiment of the present disclosure.

In the drawings: 1. fore bearing of water-cooled electric motor; 2. bearing baffle; 3. oil return tube; 4. rotor; 5. stator; 6. housing of water-cooled electric motor; 7. rear bearing of water-cooled electric motor; 8. housing of gearbox; 9. oil conduit; 10. oil storage tank; 11. pinion; and 12. gearwheel.

DETAILED DESCRIPTION

In order to make the objects, the technical solutions and the advantages of the present disclosure clearer, the embodiments of the present disclosure will be described below in further detail with reference to the drawings.

The water-cooled electric motor according to the embodiments of the present disclosure is shown in FIG. 1, and comprises components such as a rotor 4, a stator 5 and a housing 6 of the water-cooled electric motor. The rotor 4 is mounted to the shaft, and the front section and the rear section of the shaft are respectively fixed to the fore bearing 1 of the water-cooled electric motor and the rear bearing 7 of the water-cooled electric motor. A cooling channel is provided inside the housing 6 of the water-cooled electric motor, and the cooling channel is introduced with a cooling fluid to cool the electric motor.

In an electrically driven vehicle, the water-cooled electric motor is combined with a gearbox or reduction gearbox to form a driving assembly, to drive the vehicle to travel.

The First Embodiment

Figure 2:
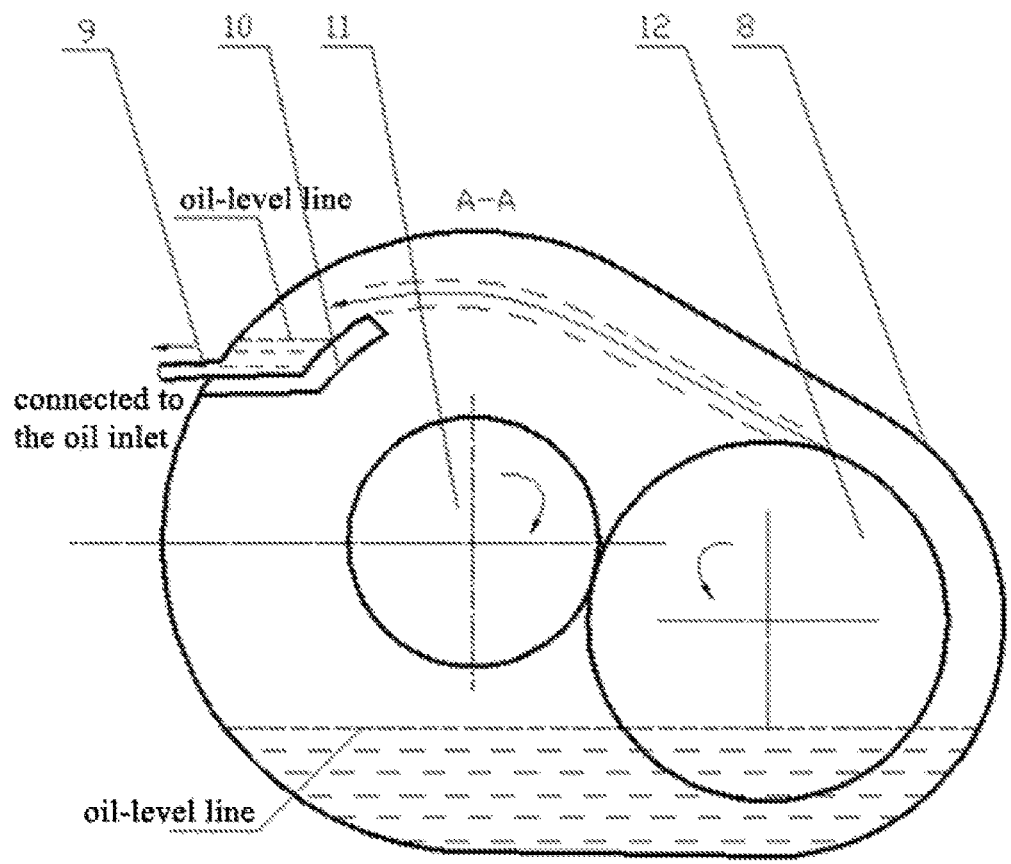
FIG. 2 is a sectional view along the A-A in FIG. 1.
Figure 3:
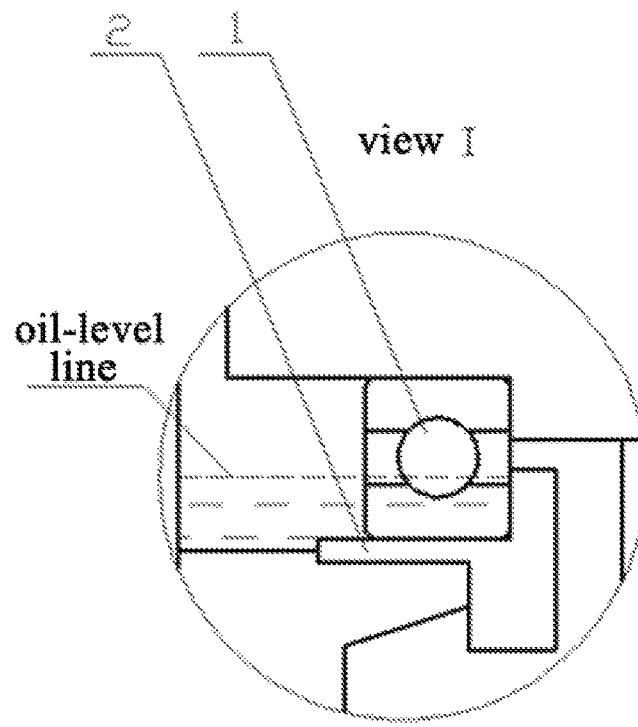
FIG. 3 is an enlarged view of the part I in FIG. 1.

FIGS. 1, 2 and 3 show the first embodiment of the present disclosure. The present embodiment provides an oil-lubrication mechanism for a fore bearing of a water-cooled electric motor. The oil-lubrication mechanism comprises a gear-splashing oil-storage structure provided in a gearbox, and a bearing-baffle oil-storage structure provided at the front end of the water-cooled electric motor, the gear-splashing oil-storage structure and the bearing-baffle oil-storage structure are communicated by an oil conduit 9, and the bearing-baffle oil-storage structure and the gearbox are communicated by an oil return tube 3; and a gear in the gearbox in operation throws a lubricating oil into the gear-splashing oil-storage structure, and the lubricating oil is delivered via the oil conduit 9 into the bearing-baffle oil-storage structure, thereby lubricating the fore bearing 1 of the water-cooled electric motor, and subsequently the lubricating oil flows back into the gearbox via the oil return tube 3.

Because the gear has the transmission teeth at the circumferential face, when the gear passes through the lubricating oil, the transmission teeth definitely take a small amount of lubricating oil, and, with the rotation of the gear, the lubricating oil is thrown in the direction of the rotation of the gear. Therefore, it can be concluded that the lubricating oil is splashing inside the gearbox.

Particularly, the gear-splashing oil-storage structure comprises an oil storage tank 10 and a gearwheel 12. The oil storage tank 10 is provided at the inner wall of the housing 8 of the gearbox, and in operation of the gears in the gearbox, the gearwheel 12 contacts the lubricating oil at the bottom of the gearbox and throws the lubricating oil into the oil storage tank 10.

In practice, the gearbox has multiple gears therein, to form multiple transmission ratios. Those gears have various diameters. Some pinions such as the pinion 11, because of the small diameters, cannot contact the lubricating oil stored at the bottom of the gearbox, so they cannot take the lubricating oil in operation. Therefore, they need rely on the gearwheels having large diameters, for example the gearwheel 12, which can take the lubricating oil in operation. Probably, there might be multiple gearwheels that can contact the lubricating oil at the bottom of the gearbox, and accordingly the amount of the taken lubricating oil is sufficient. It is sufficient that at least one of the gearwheels can contact the lubricating oil at the bottom of the gearbox.

As shown in FIG. 2, the oil storage tank 10 is fixed to the inner wall of the housing 8 of the gearbox, and an oil outlet for connecting to the oil conduit 9 is provided at the position of the housing 8 of the gearbox that corresponds to the oil storage tank 10. Here, the oil outlet is in communication with the oil storage tank 10 inwardly, and the oil outlet may be thread-fixed to or welded to the housing 8 of the gearbox.

In order to facilitate to receive the thrown lubricating oil, the side wall of the side of the oil storage tank 10 that receives the lubricating oil is arc-shaped, which increases the area of the inlet of the oil storage tank 10. The radian of the side wall may be designed by referring to the radian of the inner wall of the housing 8 of the gearbox.

The side wall of the side of the oil storage tank 10 that receives the lubricating oil may also be designed into another shape, provided that it facilitates to receive the lubricating oil and facilitates to store the thrown-in lubricating oil.

The oil storage tank 10 may be cast to the inner wall of the housing 8 of the gearbox, or be manufactured by stamping from a metal sheet or by injection moulding from plastic, and then be welded or bolt-fixed to the inner wall of the middle part of the housing of the gearbox.

As shown in FIG. 1, the bearing-baffle oil-storage structure comprises a bearing seat provided at the front end of the housing 6 of the water-cooled electric motor, the fore bearing 1 of the water-cooled electric motor is provided in the bearing seat, a bearing baffle 2 for half-closing the bearing seat is provided at the rear end of the bearing seat, the fore bearing 1 of the water-cooled electric motor presses against the bearing baffle 2, and the lubricating oil stored at the bottom of the bearing seat lubricates the fore bearing 1 of the water-cooled electric motor.

As shown in FIGS. 1 and 3, a gap is provided between an inner bore of the bearing baffle 2 and the shaft of the water-cooled electric motor, and, when the liquid level of the lubricating oil stored at the bottom of the bearing seat is higher than the edge of the inner bore of the bearing baffle 2, the lubricating oil flows out of the bearing seat, and flows into the housing 6 of the water-cooled electric motor. The fore bearing 1 of the water-cooled electric motor does not block the lubricating oil.

Because the cables inside the water-cooled electric motor such as the stator winding and the rotor winding are insulated, the lubricating oil can flow into the housing 6 of the water-cooled electric motor, and then flow back into the gearbox via the oil return tube 3.

The bearing baffle 2 may be thread-fixed to the rear end of the bearing seat, and the threaded connection is required to be sealed, to prevent the lubricating oil from leaking from the threaded connection, to enable the lubricating oil stored at the bottom of the bearing seat to maintain a certain oil-level height.

The housing 6 of the water-cooled electric motor comprises a front end cover, the bearing seat is provided in the front end cover, and an oil inlet for connecting to the oil conduit 9 is provided at the position of the front end cover that corresponds to the bearing seat. Here, the oil inlet is in communication with the bearing seat inwardly, and the oil inlet may be thread-fixed to or welded to the housing 6 of the water-cooled electric motor.

The front end of the bearing seat does not penetrate through the front end cover, so it is closed, and the oil inlet may be provided here. The front end of the bearing seat may also penetrate through the front end cover, and then a cover is provided to close it, to ensure that the lubricating oil does not leak from the front end of the bearing seat.

In the present embodiment, the oil return tube 3 is provided in the inner wall of the housing of the lower part of the water-cooled electric motor, the inlet of the oil return tube 3 is located inside the housing 6 of the water-cooled electric motor, and the lubricating oil flows out of the bearing seat, and flows back into the gearbox via the oil return tube 3, to form a complete oil way.

The liquid level of the lubricating oil stored at the bottom of the gearbox is lower than the oil return tube 3, so the lubricating oil in the oil return tube 3 can smoothly flow back into the gearbox.

The housing 6 of the water-cooled electric motor is provided with a cooling channel therein, so the housing 6 of the water-cooled electric motor has a certain wall thickness, which may be used to arrange the oil return tube 3.

In the present embodiment, the oil conduit 9 is a single tube. As shown in FIG. 1, the upper end of the oil conduit 9 is connected to the oil outlet at the housing 8 of the gearbox, and the lower end is connected to the oil inlet at the housing 6 of the water-cooled electric motor. The oil conduit 9 may be a metal hard tube or a metal hose, and both of the upper end and the lower end are provided with a tube joint.

The rear end of the housing 6 of the water-cooled electric motor is mounted to the front end cover of the housing 8 of the gearbox, and an oil inlet that is in communication with the oil return tube 3 is provided at the front end cover of the housing of the gearbox. Here, the oil inlet is in communication with the interior of the housing 8 of the gearbox inwardly, and the lubricating oil, after entering the interior of the housing 8 of the gearbox, is stored at the bottom of the housing 8 of the gearbox, and continues to be taken by the gearwheel 12, to form the lubricating-oil circulation path.

It can be seen from FIG. 1 that a rear bearing 7 of the water-cooled electric motor is provided at the rear end of the shaft of the water-cooled electric motor, and the rear bearing 7 of the water-cooled electric motor is located inside the housing 8 of the gearbox. Because the lubricating oil is splashing inside the gearbox, the rear bearing 7 of the water-cooled electric motor can be lubricated by the lubricating oil inside the gearbox.

As shown in FIG. 2, the liquid level of the lubricating oil in the gear-splashing oil-storage structure is higher than the liquid level of the lubricating oil in the bearing-baffle oil-storage structure, and the lubricating oil is delivered by gravity from the gear-splashing oil-storage structure to the bearing-baffle oil-storage structure via the oil conduit 9.

The gearbox in the present embodiment may also be replaced with a reduction gearbox. The function of the reduction gearbox differs from that of the gearbox, in that the reduction gearbox is merely used to decelerate. The gear-splashing oil-storage structure has the same structure configuration in the gearbox and in the reduction gearbox, which is not described repeatedly here.

Both of the fore bearing 1 of the water-cooled electric motor and the rear bearing 7 of the water-cooled electric motor in the present embodiment are lubricated by oil, which is suitable for high-speed rotation, has a good high-temperature stability, and can reduce the temperature, facilitate to remove the abrasive particles and dusts inside the bearing, and increase the life of the bearing.

The Second Embodiment

The present embodiment differs from the first embodiment in that the oil conduit is provided in the inner wall of the housing of the upper part of the water-cooled electric motor. The housing of the water-cooled electric motor is provided with a cooling channel therein, so the housing of the water-cooled electric motor has a certain wall thickness, which may be used to arrange the oil conduit.

Correspondingly, an input oil channel that is in communication with the oil conduit is provided in the front end cover of the housing 6 of the water-cooled electric motor at the upper part of the bearing seat.

The input oil channel in the front end cover may be in the vertical direction, and after the front end cover has been installed, the input oil channel communicates with the oil return tube 3.

In order to be able to communicate with the oil storage tank 10 inside the gearbox or the reduction gearbox, and ensure that the liquid level of the lubricating oil in the gear-splashing oil-storage structure is higher than the liquid level of the lubricating oil in the bearing-baffle oil-storage structure, the oil conduit is required to be lifted at the rear end. Therefore, at least at the rear end of the housing 6 of the water-cooled electric motor, an upward protrusion is provided, and the oil conduit is arranged along the protrusion, to communicate with the oil storage tank 10.

In the present embodiment, the other structures of the oil-lubrication mechanism for a fore bearing of a water-cooled electric motor are the same as those of the first embodiment, and are not described repeatedly here.

The Third Embodiment

The present embodiment provides a water-cooled-electric-motor driving assembly, comprising a water-cooled electric motor and a gearbox or a reduction gearbox, wherein the water-cooled-electric-motor driving assembly further comprises the oil-lubrication mechanism for a fore bearing of a water-cooled electric motor according to the first embodiment or the second embodiment.

Taking the gearbox as an example, as shown in FIG. 1, the water-cooled electric motor and the gearbox are combined, the water-cooled electric motor may not be provided with a rear end cover, the rear end of the housing 6 of the water-cooled electric motor is mounted to the front end cover of the housing 8 of the gearbox, and the shaft of the water-cooled electric motor and the input shaft of the gearbox are integrally formed, which can reduce the axial width of the water-cooled-electric-motor driving assembly.

The function of the reduction gearbox differs from that of the gearbox, in that the reduction gearbox is merely used to decelerate. The structure of the combination of the reduction gearbox and the water-cooled electric motor may refer to the above-described structure of the combination of the gearbox and the water-cooled electric motor.

The above are merely particular embodiments of the present disclosure. By the teaching of the present disclosure, a person skilled in the art can make other modifications or variations on the basis of the above embodiments. A person skilled in the art should understand that the above particular descriptions are merely for the purpose of better interpreting the present disclosure, and the protection scope of the present disclosure should be subject to the protection scope of the claims.

What is claimed is:

1. An electric-motor driving assembly comprising:
   a water-cooled electric motor and a gearbox or a reduction gearbox; and
   an oil-lubrication mechanism for a fore bearing of the water-cooled electric motor, wherein the oil-lubrication mechanism comprises a gear-splashing oil-storage structure provided in the gearbox or the reduction gearbox, and a bearing-baffle oil-storage structure provided at a front end of the water-cooled electric motor,
   wherein the gear-splashing oil-storage structure and the bearing-baffle oil-storage structure are communicated by an oil conduit, and the bearing-baffle oil-storage structure and the gearbox or the reduction gearbox are communicated by an oil return tube, and
   wherein a gear in the gearbox or the reduction gearbox, in operation, throws a lubricating oil into the gear-splashing oil-storage structure, and the lubricating oil is delivered via the oil conduit into the bearing-baffle oil-storage structure, thereby lubricating the fore bearing of the water-cooled electric motor, and subsequently the lubricating oil flows back into the gearbox or the reduction gearbox via the oil return tube,
   wherein the oil conduit is a single tube and located outside of a housing of the water-cooled electric motor, an upper end of the oil conduit is connected to an oil outlet at a housing of the gearbox, and a lower end of the oil conduit is connected to an oil inlet at the housing of the water-cooled electric motor, the oil return tube is provided in an inner wall of the housing of a lower part of the water-cooled electric motor,
   wherein the bearing-baffle oil-storage structure comprises a bearing seat provided at a front end of the housing of the water-cooled electric motor, the fore bearing of the water-cooled electric motor is provided in the bearing seat, a bearing baffle for half-closing the bearing seat is provided at a rear end of the bearing seat, the fore bearing of the water-cooled electric motor presses against the bearing baffle, and the lubricating oil stored at a bottom of the bearing seat lubricates the fore bearing of the water-cooled electric motor, and
   wherein a gap is provided between an inner bore of the bearing baffle and a shaft of the water-cooled electric motor, and the gap extends from the shaft of the water-cooled electric motor to the inner bore of the bearing baffle, and when a liquid level of the lubricating oil stored at the bottom of the bearing seat is higher than an edge of the inner bore of the bearing baffle, the lubricating oil flows out of the bearing seat, and flows into the housing of the water-cooled electric motor.

2. The electric-motor driving assembly according to claim 1, wherein the housing of the water-cooled electric motor comprises a front end cover, the bearing seat is provided in the front end cover, and the oil inlet for connecting to the oil conduit is provided at a position of the front end cover that corresponds to the bearing seat.

3. The electric-motor driving assembly according to claim 1, wherein an inlet of the oil return tube is located inside the housing of the water-cooled electric motor, and the lubricating oil flows out of the bearing seat, and flows back into the gearbox or the reduction gearbox via the oil return tube, to form a complete oil way.

* * * * *